Feb. 7, 1933. H. DOHSE 1,896,483
PRODUCTION OF SULPHUR DIOXIDE
Filed Dec. 29, 1931
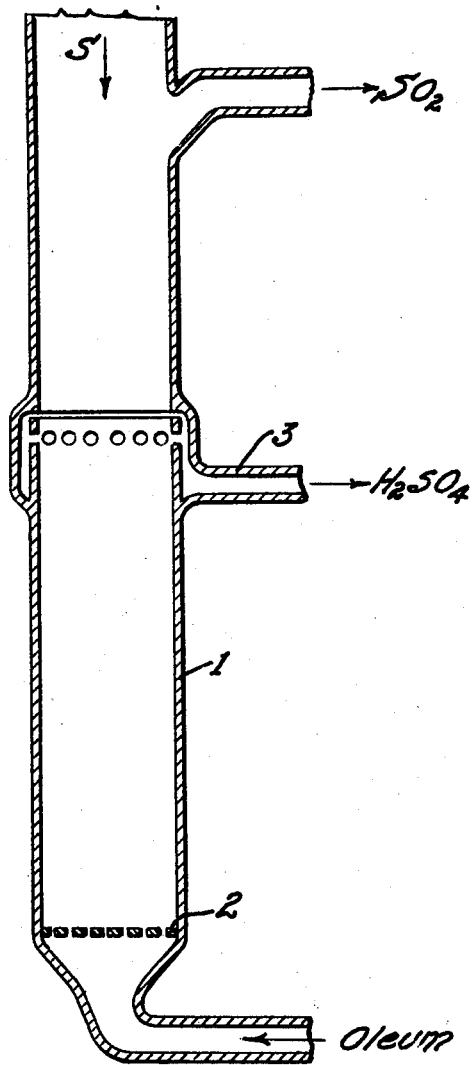
Inventor
HANS DOHSE.
By his Attorneys
Hauff-Sbarland Patented Feb. 7, 1933

1,896,483

UNITED STATES PATENT OFFICE

HANS DOHSE, OF HEIDELBERG, GERMANY, ASSIGNOR TO I. G. FARBENINDUSTRIE AKTIENGESELLSCHAFT, OF FRANKFORT-ON-THE-MAIN, GERMANY

PRODUCTION OF SULPHUR DIOXIDE

Application filed December 29, 1931, Serial No. 583,696, and in Germany January 2, 1931.

The present invention relates to the production of sulphur dioxide.

Prior to this invention sulphur dioxide has been produced in many industrial processes in the form of dilute gases containing sulphur dioxide; for example gases containing a few per cent of sulphur dioxide are obtained in the roasting of sulphide ores. Many attempts have been made to produce pure or substantially pure sulphur dioxide from such gases. Thus, it has been attempted to recover the sulphur dioxide from these gases by absorbing it in water. This process, however, has the disadvantage that the absorption of the sulphur dioxide in water and the recovery of the concentrated sulphur dioxide from the aqueous solution involve a very great consumption of heat and that there is the risk that part of the sulphur dioxide is oxidized, forming sulphuric acid with the water. It has also been proposed to carry out such absorption processes under elevated pressures by means of organic solvents for sulphur dioxide such as tar oil but this process has the disadvantage that in order to obtain satisfactory results comparatively high pressures are required.

The process of the present invention is concerned more particularly with a method which is entirely different from the aforesaid known processes. Use is made in the process according to the present invention of a reaction similar to the known interaction of sulphuric acid and elementary sulphur. As is known sulphuric acid is reduced by sulphur at elevated temperatures to sulphur dioxide. It is also known that sulphur is soluble in sulphur trioxide and that this solution when heated is decomposed with the formation of sulphur dioxide. So far, however, these processes have not been used on an industrial scale in view of the numerous difficulties encountered in their operation.

I have now found that pure sulphur dioxide can be obtained in a simple manner and in a continuous process by acting with fuming sulphuric acid on solid or liquid sulphur in a counter current at elevated temperatures. The temperatures used need not be above the melting point of the sulphur and should preferably range between about 80° and about 150° C. and most suitably between about 100° C. and the melting point of sulphur. In this process mainly the sulphur trioxide contained in the fuming sulphuric acid reacts with the sulphur so that pure sulphur dioxide and in addition thereto sulphuric acid of about 99 per cent strength is obtained.

The process is preferably carried out by passing the fuming sulphuric acid from below through a reaction vessel containing a layer of sulphur granules of suitable height. In the lower part of the layer of sulphur where the fresh fuming sulphuric acid comes into contact with the sulphur a gas mixture consisting of sulphur dioxide and sulphur trioxide is formed but from this gas the sulphur trioxide is absorbed by the more dilute fuming sulphuric acid or the sulphuric acid formed therefrom in the upper parts of the reaction vessel and thus brought to reaction with further amounts of sulphur. The sulphur is supplied into the reaction vessel from above either continuously or periodically whereby preferably the layer of sulphur is kept at a certain minimum height as for example a height between ½ and 2 metres. The necessary height of the sulphur layer depends on the working temperature, on the speed and concentration of the fuming sulphuric acid and on the dimensions of the reaction vessel. It is preferable to maintain the layer of sulphur at a height somewhat greater than absolutely necessary in order to completely convert the dissolved sulphur trioxide also in case the speed of the fuming sulphuric acid should occasionally increase somewhat. The heat required for the reaction is preferably supplied by preheating the fuming sulphuric acid before supplying it into the reaction vessel to somewhat above the desired reaction temperature. It is also preferable to provide the reaction vessel with an isolation against losses of heat.

The process according to the present invention is preferably combined with a plant for the catalytic manufacture of sulphuric acid. The sulphuric acid obtained in the process according to the present invention is then reintroduced into the absorbers for the sulphur trioxide formed in the catalytic oxidation of dilute sulphur dioxide whereby it is reconverted into fuming sulphuric acid which is then used again for the conversion with elementary sulphur for the production of pure sulphur dioxide.

It is possible by the process according to the present invention to produce in a continuous manner and in comparatively small apparatus large amounts of sulphur dioxide which is pure or practically pure and in particular is free from oxygen.

The process according to the present invention will now be further explained with reference to the accompanying drawing which illustrates diagrammatically in vertical section an apparatus suitable for carrying out the process; it is to be understood, however, that the process is not restricted to the use of the specific apparatus shown. The apparatus consists of a reaction tower 1, which is well isolated against losses of heat. A layer of sulphur is arranged in the vessel 1 on a grate 2 and fuming sulphuric acid containing for example 23 per cent of sulphur trioxide preheated to 125° C. is passed through the reaction vessel from below. Since the lower portions of the sulphur layer are rapidly used by the layer of sulphur gradually moves downward in a counter current to the fuming sulphuric acid flowing in an upward direction. Sulphur in an amount corresponding to that consumed by the reaction is periodically or continuously supplied into the reaction vessel 1 at the top thereof by means of suitable supply devices such as sluices (not shown). The reaction vessel 1 is provided at 3 with an overflow device through which the concentrated sulphuric acid formed is withdrawn. The pure sulphur dioxide formed escapes at the upper end of the reaction vessel.

What I claim is:—

1. The process of producing sulphur dioxide which comprises acting with a fuming sulphuric acid at a temperature between about 80° and about 150° C. in a counter current on elementary sulphur.

2. The process of producing sulphur dioxide which comprises acting with fuming sulphuric acid at a temperature between about 100° C. and the melting point of sulphur in a counter current on elementary sulphur.

3. The process of producing sulphur dioxide which comprises acting with fuming sulphuric acid at a temperature between about 80° and about 150° C. in a counter current on elementary sulphur, passing a gas containing sulphur trioxide through the sulphuric acid formed and contacting the resulting fuming sulphuric acid again with elementary sulphur at the aforesaid temperature.

4. The process of producing sulphur dioxide which comprises acting with fuming sulphuric acid at a temperature between about 100° C. and the melting point of sulphur in a counter current on elementary sulphur, passing a gas containing sulphur trioxide through the sulphuric acid formed and contacting the resulting fuming sulphuric acid again with elementary sulphur at the aforesaid temperature.

In testimony whereof I have hereunto set my hand.

HANS DOHSE.